US012744345B2

(12) United States Patent
Hsiao

(10) Patent No.: US 12,744,345 B2
(45) Date of Patent: Sep. 22, 2026

(54) CONNECTOR

(71) Applicant: Delta Electronics, Inc., Taoyuan City (TW)

(72) Inventor: Wei-Kai Hsiao, Taoyuan City (TW)

(73) Assignee: Delta Electronics, Inc., Taoyuan City (TW)

( * ) Notice: Subject to any disclaimer, the term of this patent is extended or adjusted under 35 U.S.C. 154(b) by 331 days.

(21) Appl. No.: 18/584,337

(22) Filed: Feb. 22, 2024

(65) Prior Publication Data

US 2025/0174928 A1 May 29, 2025

(30) Foreign Application Priority Data

Nov. 29, 2023 (CN) ......................... 202311622150.1

(51) Int. Cl.
*H01R 13/453* (2006.01)
*H01R 13/629* (2006.01)

(52) U.S. Cl.
CPC ....... *H01R 13/4538* (2013.01); *H01R 13/629* (2013.01)

(58) Field of Classification Search
CPC .............. H01R 13/4538; H01R 13/629; H01R 13/6273; H01R 13/625; H01R 13/631; H01R 13/4532; H01R 24/20; H01R 24/28; H01R 24/005; H01R 13/04
See application file for complete search history.

(56) References Cited

U.S. PATENT DOCUMENTS 7,467,965 B1 * 12/2008 Arai .................. H01R 13/6273 439/353
10,559,916 B1 * 2/2020 Lo .......................... H01R 31/06
11,233,357 B2 * 1/2022 Lo ........................... B60L 53/16
2009/0291579 A1 * 11/2009 Farole .................. H01R 12/592 439/296
2017/0062978 A1 * 3/2017 Seido ................. H01R 13/5219
2019/0245303 A1 * 8/2019 Seido ................... H01R 13/631
2020/0052433 A1 * 2/2020 Lo ...................... H01R 13/5219
2021/0143576 A1 * 5/2021 Lo .......................... H01R 31/06
2021/0164510 A1 * 6/2021 Liu ....................... F16B 21/071
2025/0174928 A1 * 5/2025 Hsiao ................. H01R 13/4532

FOREIGN PATENT DOCUMENTS

CN 219268048 U 6/2023
DE 615452 C 7/1935
EP 0665454 A1 8/1995
TW 201739641 A 11/2017

* cited by examiner

*Primary Examiner* — Abdullah A Riyami
*Assistant Examiner* — Nader J Alhawamdeh
(74) *Attorney, Agent, or Firm* — KIRTON McCONKIE; Evan R. Witt

(57) ABSTRACT

A connector is provided. The connector of the present disclosure includes a first barrier and a second barrier. The plurality of first connecting terminals of the socket connecting element are disposed between the first barrier and the bottom of the first main body. The plurality of second connecting terminals of the plug connecting element are disposed between the second barrier and the bottom of the second main body. When the first main body is rotated and moved through the first path so as to drive the first barrier and the second barrier to rotate and move, the second connecting terminal penetrates through the second hole and the first hole so as to contact with the first connecting terminal.

9 Claims, 12 Drawing Sheets

CONNECTOR

CROSS-REFERENCE TO RELATED APPLICATION

This application claims priority to China Patent Application No. 202311622150.1 filed on Nov. 29, 2023, the entire contents of which are incorporated herein by reference for all purposes.

FIELD OF THE INVENTION

The present disclosure relates to a connector, and more particularly to a connector having enhanced safety.

BACKGROUND OF THE INVENTION

Nowadays, the connector does not comprise a protect device. Consequently, the charged metal connecting terminal of the connector is directly contacted by user. Moreover, the market demand is increased, and the battery capacity of the electronic product is increased, so that the output voltage of the electronic product outputted from the connector is also increased. When the output voltage of the electronic product outputted from the connector is greater than 42V, it surpasses the safety regulation. Consequently, when the internal voltage protection of the electronic product is failed, the risk of user getting an electric shock is high for contacting the metal connecting terminal of the connector.

Therefore, there is a need of providing a connector to obviate the drawbacks encountered from the prior arts.

SUMMARY OF THE INVENTION

The present disclosure provides a connector. The connector of the present disclosure includes a first barrier and a second barrier. The plurality of first connecting terminals of the socket connecting element are disposed between the first barrier and the bottom of the first main body. The plurality of second connecting terminals of the plug connecting element are disposed between the second barrier and the bottom of the second main body. When the first main body is rotated and moved through the first path so as to drive the first barrier and the second barrier to rotate and move, the second connecting terminal penetrates through the second hole and the first hole so as to contact with the first connecting terminal. Consequently, when the plug connecting element is not assembled with the socket connecting element, the second barrier of the plug connecting element covers the second connecting terminal, and the second connecting terminal cannot be exposed so as to prevent user to contact with the second connecting terminal. When the plug connecting element is assembled with the socket connecting element, the first main body is rotated and moved, so that the second connecting terminal penetrates through the second hole of the second barrier to contact with the first connecting terminal. Consequently, the safety of the connector of the present disclosure is enhanced, and the risk of user getting an electric shock is reduced.

In accordance with an aspect of the present disclosure, a connector is provided. The connector includes a socket connecting element and a plug connecting element. The socket connecting element includes a first main body, a first barrier and a plurality of first connecting terminals. An inner periphery surface of the first main body includes a first guiding portion. The first main body includes a first receiving portion. The first barrier is disposed in the first receiving portion and fixed on the first main body. The first barrier includes a first aligning portion and a plurality of first holes. The first aligning portion is disposed on one side of the first barrier away from a bottom of the first main body. The plurality of first holes and the plurality of first connecting terminals are spatially corresponding in position in one-to-one relationship. Each one of the plurality of first connecting terminals is disposed on the bottom of the first main body. The plug connecting element includes a second main body, a second barrier and a plurality of second connecting terminals. An outer periphery surface of the second main body includes a first path. The second main body includes a second receiving portion. The second barrier is disposed in the second receiving portion and includes a second aligning portion and a plurality of second holes. The second aligning portion is disposed on one side of the second barrier away from a bottom of the second main body. Each one of the plurality of second connecting terminals is disposed on the bottom of the second main body. The second aligning portion and the first aligning portion are aligned to each other, so that the plurality of second holes and the plurality of first holes are spatially corresponding in position in one-to-one relationship. The first guiding portion of the first main body is aligned to the first path of the second main body. The first main body is driven to be rotated and moved through a track of the first path. The first barrier and the second barrier are rotated and moved, so that each one of the plurality of second connecting terminals penetrates through corresponding one of the plurality of second holes and corresponding one of the plurality of first holes so as to contact with corresponding one of the first connecting terminal.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
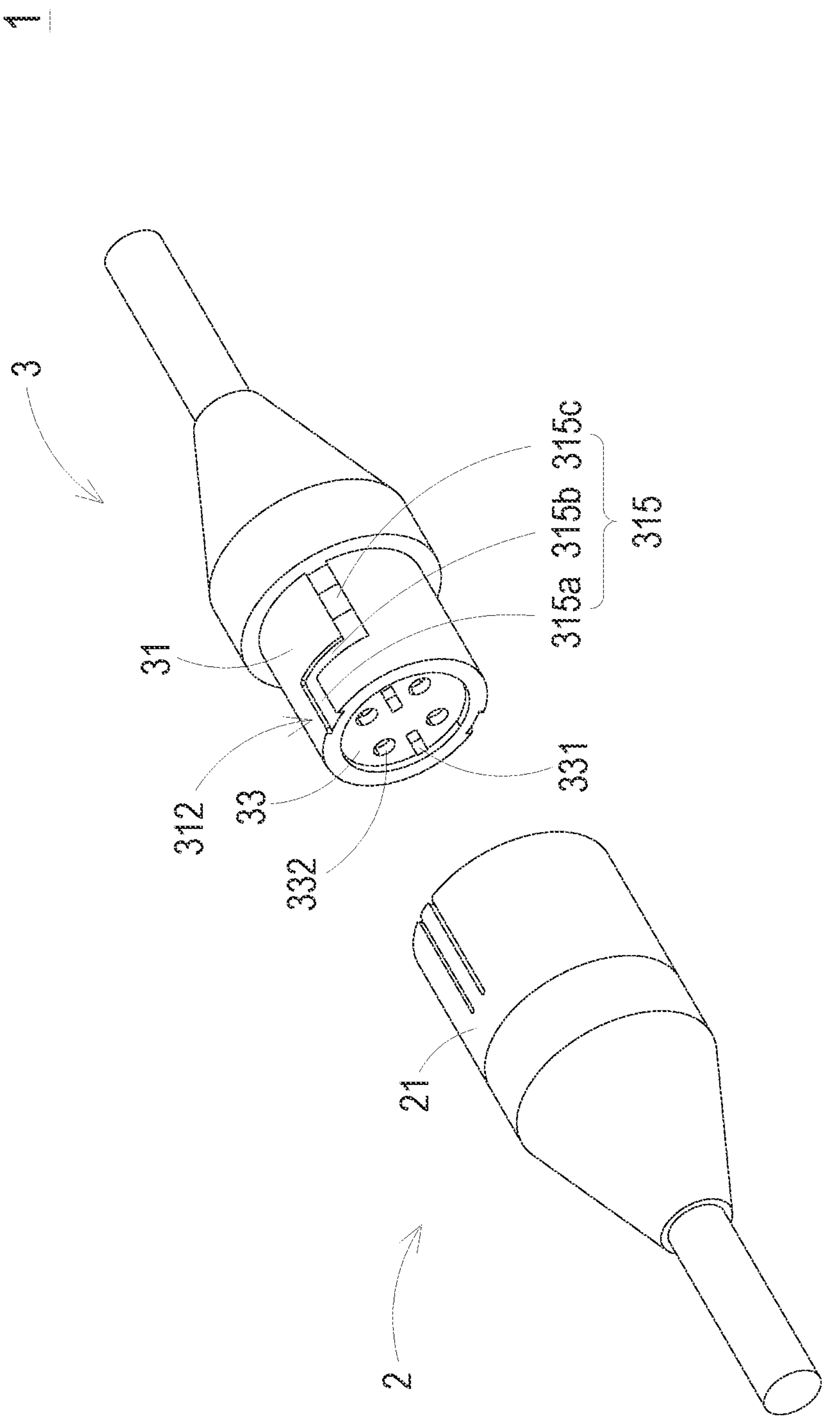
FIG. 1 is a schematic view illustrating a connector of the present disclosure.
Figure 2:
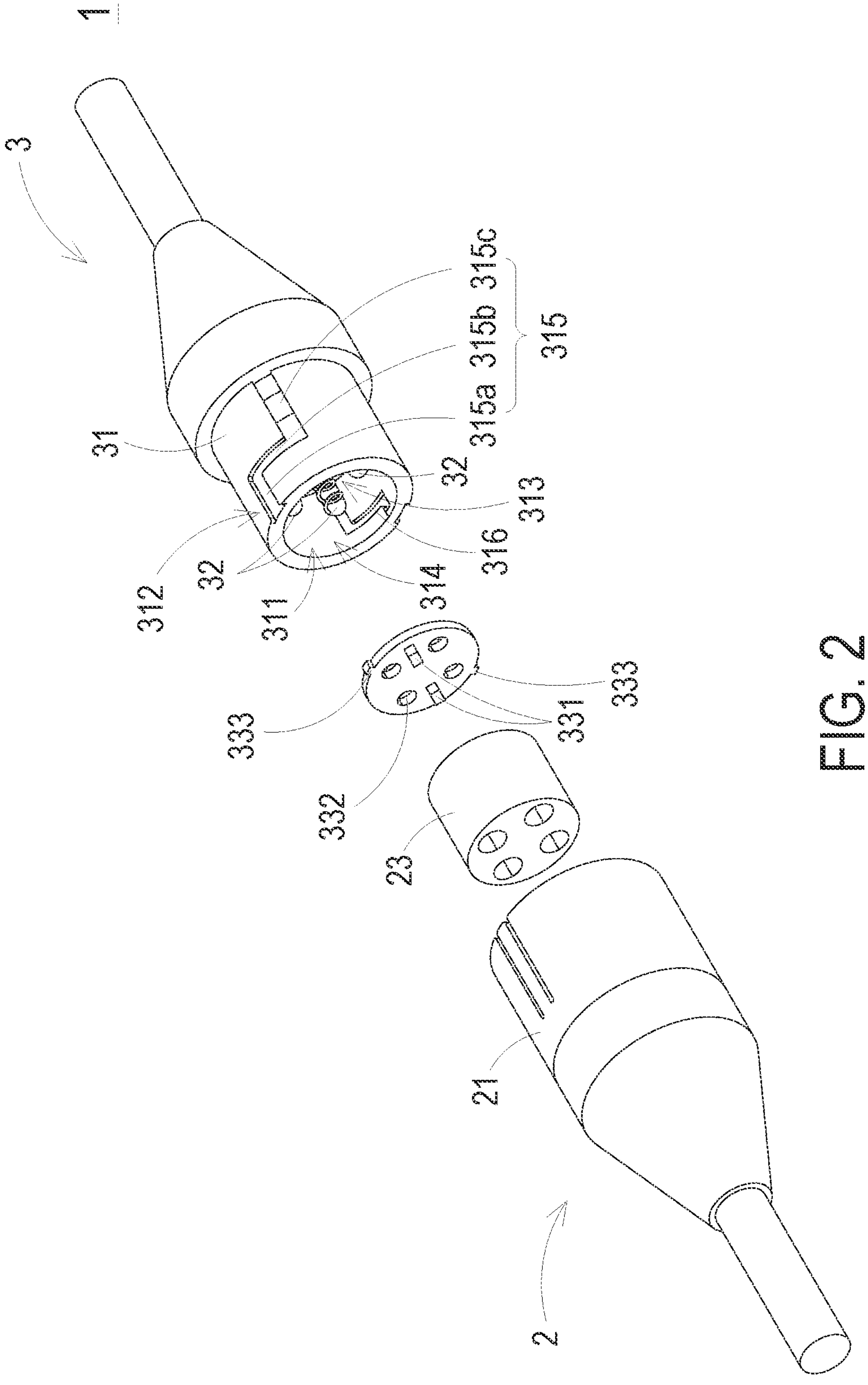
FIG. 2 is a schematic exploded view illustrating the connector of FIG. 1.
Figure 3:
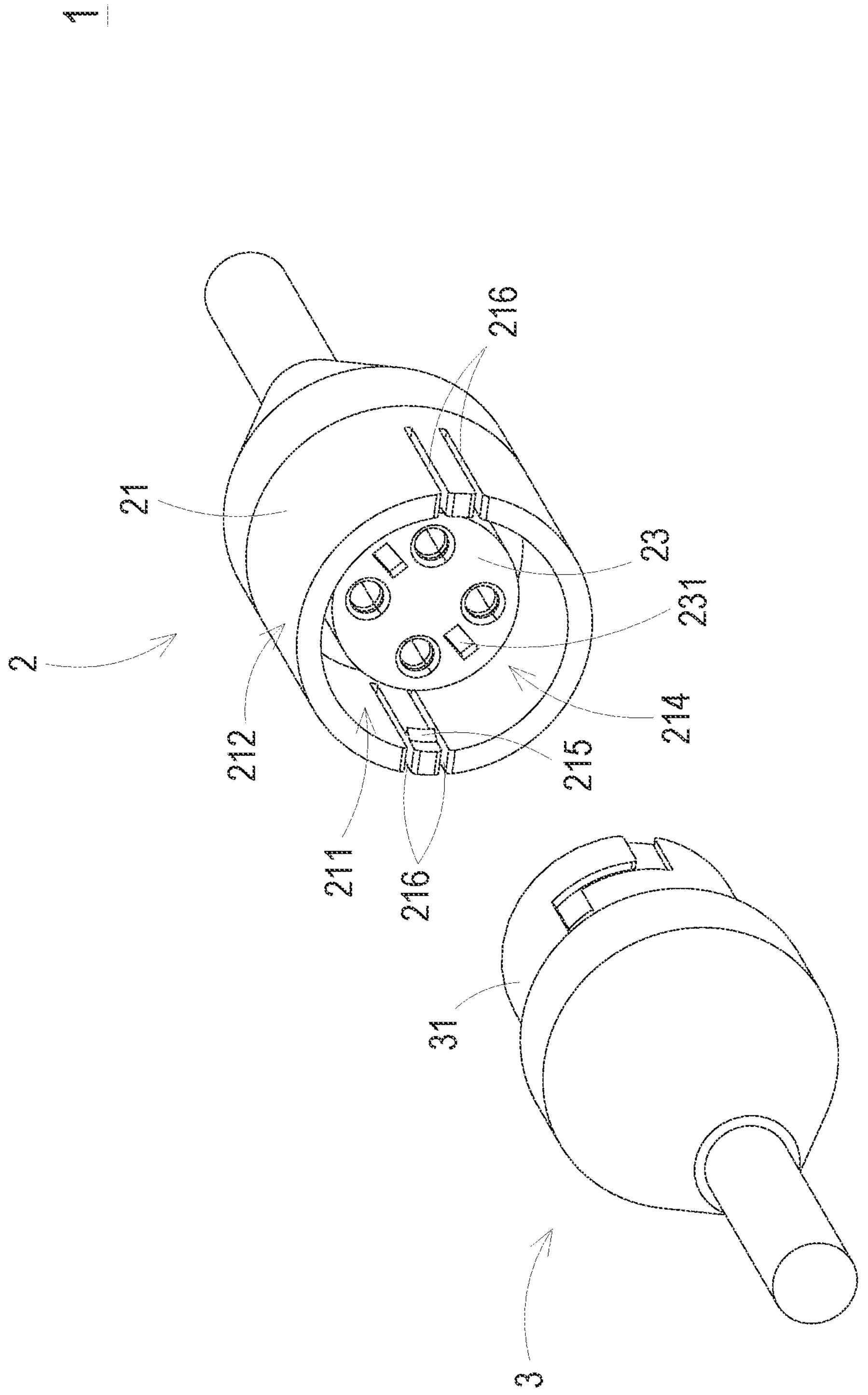
FIG. 3 is a schematic view illustrating the connector of FIG. 1 taken from another viewpoint.
Figure 4:
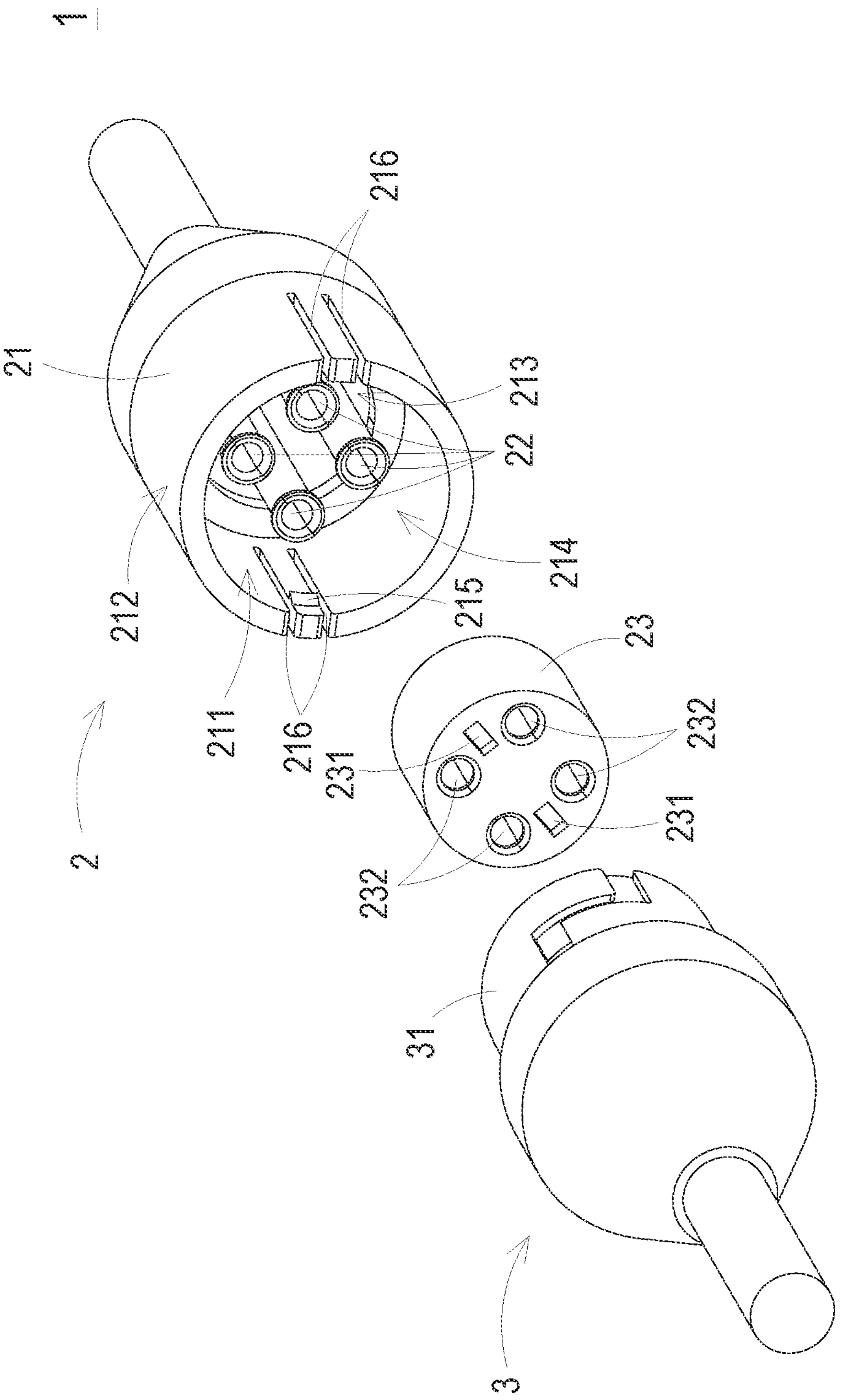
FIG. 4 is a schematic exploded view illustrating the connector of FIG. 3.

FIG. 1 is a schematic view illustrating a connector of the present disclosure. FIG. 2 is a schematic exploded view illustrating the connector of FIG. 1. FIG. 3 is a schematic view illustrating the connector of FIG. 1 taken from another viewpoint. FIG. 4 is a schematic exploded view illustrating the connector of FIG. 3. As shown in FIGS. 1 to 4, the connector 1 of the present disclosure includes a socket connecting element 2 and a plug connecting element 3.

As shown in FIGS. 3 and 4, the socket connecting element 2 includes a first main body 21, four first connecting terminals 22 and a first barrier 23. The first main body 21 is a hollow cylinder and includes an inner periphery surface 211, an outer periphery surface 212, a bottom 213, a first receiving portion 214 and two first guiding portions 215. The inner periphery surface 211 and the outer periphery surface 212 of the first main body 21 are opposite to each other. The outer periphery surface 212 of the first main body 21 is disposed around the inner periphery surface 211 of the first main body 21. The bottom 213 is connected with the inner periphery surface 211 and the outer periphery surface 212. The inner periphery surface 211 and the bottom 213 of the first main body 21 together define the first receiving portion 214. The opening of the first receiving portion 214 is toward the plug connecting element 3. The two first guiding portions 215 are extended from the inner periphery surface 211 of the first main body 21 and perpendicular to the inner periphery surface 211, respectively. The two first guiding portions 215 are disposed on the two opposite sides of the first main body 21 and disposed in the first receiving portion 214, respectively. In this embodiment, the first main body 21 further includes a plurality of gaps 216. For example, the first main body 21 includes four gaps 216. Each gap 216 is concavely formed from one side of the first main body 21 adjacent to the plug connecting element 3 away from the plug connecting element 3. Each first guiding portion 215 is disposed between the two corresponding gaps 216 so that the position of the first guiding portion 215 can be confirmed according to the position of the two gaps 216.

Each first connecting terminal 22 is a conductive structure and extended from the bottom 213 of the first main body 21 toward the plug connecting element 3. In this embodiment, the four first connecting terminals 22 are disposed around in sequence. Two of the four first connecting terminals 22 are disposed on the line formed between the two first guiding portions 215. One of the two first connecting terminals 22 disposed on the line formed between the two first guiding portions 215 is adjacent to one of the two first guiding portions 215. The other of the two first connecting terminals 22 disposed on the line formed between the two first guiding portions 215 is adjacent to the other of the two first guiding portions 215.

The first barrier 23 is disposed in the first receiving portion 214 of the first main body 21 and fixed on the first main body 21. For example, the first barrier 23 is fixed on the bottom 213 of the first main body 21 and covers the four first connecting terminals 22. The four first connecting terminals 22 are disposed on the bottom 213 of the first main body 213. The first barrier 23 includes two first aligning portions 231 and four first holes 232. The two first aligning portions 231 are disposed on one side of the first barrier 23 away from the bottom 213 of the first main body 21. Namely, the two first aligning portions 231 are disposed on one side of the first barrier 23 facing to the plug connecting element 3. Preferably but not exclusively, each first aligning portion 231 is a concave structure. The four first holes 232 penetrates through the first barrier 23, respectively. The four first holes 232 and the four first connecting terminals 22 are spatially corresponding in position in a one-to-one relationship. Namely, each first connecting terminal 22 is exposed through the corresponding first hole 232.

As shown in FIGS. 1 and 2, the plug connecting element 3 includes a second main body 31, four second connecting terminals 32 and a second barrier 33. The second main body 31 is a hollow cylinder and includes an inner periphery surface 311, an outer periphery surface 312, a bottom 313, a second receiving portion 314, two first paths 315 and two second paths 316. The inner periphery surface 311 and the outer periphery surface 312 of the second main body 31 are opposite to each other. The outer periphery surface 312 of the second main body 31 is disposed around the inner periphery surface 311 of the second main body 31. The diameter formed by the inner periphery surface 211 of the first main body 21 is greater than or equal to the diameter formed by the second outer periphery surface 312 of the second main body 31. The bottom 313 is connected with the inner periphery surface 311 and the outer periphery surface 312. The inner periphery surface 311 and the bottom 313 of the second main body 31 together define the second receiving portion 314. The opening of the second receiving portion 314 is toward the socket connecting element 2. The two first paths 315 are concavely formed from the outer periphery surface 312 of the second main body 31. The two first paths 315 are disposed on the two opposite sides of the second main body 31. When the socket connecting element 2 is assembled to the plug connecting element 3, the two first guiding portions 215 of the first main body 21 are aligned to and engaged with the corresponding first path 315, respectively, so as to drive the first main body 21 to rotate and/or move according to the track of the first path 315.

In this embodiment, as shown in FIGS. 1 and 2, each first path 315 of the second main body 31 includes a first interval **315*a*, a second interval 315*b* and a third interval 315*c*. The first interval 315*a*, the second interval 315*b* and the third interval 315*c* are disposed on the outer periphery surface 312 of the second main body 31 in sequence. A first end of the first interval 315*a* of the first path 315 is disposed on one end of the outer periphery surface 312 of the second main body 21 adjacent to the socket connecting element 2. The extension direction of the first interval 315*a* is the same as the axial direction of the second main body 31. A first end of the second interval 315*b* of the first path 315 is in communication with a second end of the first interval 315*a* of the first path 315. The extension direction of the second interval 315*b* is perpendicular to the extension direction of the first interval 315*a*. A first end of the third interval 315*c* of the first path 315 is in communication with a second end of the second interval 315*b* of the first path 315. The extension direction of the third interval 315*c* is the same as the extension direction of the first interval 315*a*. Namely, the extension direction of the third interval 315*c* is the same as the axial direction of the second main body 31**.

The two second paths 316 of the second main body 31 are concavely formed from the inner periphery surface 311 of the second main body 31, respectively. The two second paths 316 are disposed on the two opposite sides of the second main body 31. The track of each second path 316 and the track of the corresponding first path 315 are aligned to each other and disposed on the two opposite sides of the surface of the second main body 31. Namely, the second path 316 includes three intervals. Each interval of the second path 316 and the corresponding interval of the first path 315 are disposed on the two opposite sides of the surface of the second main body 31. For example, the three intervals of the second path 316 are similar to the first interval **315*a*, the second interval 315*b* and the third interval 315*c* of the first path 315**, respectively, and are not redundantly described hereinafter.

Each second connecting terminal 32 is a conductive structure and extended from the bottom 313 of the second main body 31 toward the socket connecting element 2. In this embodiment, the four second connecting terminals 32 are disposed around in sequence. Two of the four second connecting terminals 32 are adjacent to the intervals of the two second paths 316 corresponding to the third interval 315*c* of the first path 315, respectively.

The second barrier 33 is disposed in the second receiving portion 314 of the second main body 31. The four second connecting terminals 32 are disposed on the bottom 313 of the second main body 31. The second barrier 33 includes two second aligning portions 331, four second holes 332 and two second guiding portions 333. The two second aligning portions 331 are disposed on one side of the second barrier 33 away from the bottom 313 of the second main body 31. Namely, the two second aligning portions 331 are disposed on one side of the second barrier 33 facing to the socket connecting element 2. Preferably but not exclusively, each second aligning portion 331 is a protrusion structure. Each second aligning portion 331 is aligned to the corresponding first aligning portion 231 of the first barrier 23. The four second holes 332 penetrates through the second barrier 33, respectively. When the socket connecting element 2 is assembled to the plug connecting element 3 and the second aligning portion 331 is aligned to the first aligning portion 231, the four second holes 332 of the second barrier 33 and the four first holes 232 of the first barrier 23 are spatially corresponding in position in a one-to-one relationship.

The two second guiding portions 333 are protruded from the outer periphery edge of the second barrier 33. Each second guiding portion 333 is aligned to the corresponding second path 316 so as to drive the second barrier 33 to rotate and/or move according to the track of the second path 316. When the second guiding portion 333 of the second barrier 33 is disposed in the interval of the second path 316 of the second main body 31 corresponding to the first interval 315*a* of the first path 315, the four second connecting terminals 32 are covered by the second barrier 33 and cannot be exposed thorough the four second holes 332. When the second guiding portion 33 of the second barrier 33 is disposed in the interval of the second path 316 of the second main body 31 corresponding to the third interval 315*c* of the first path 315, the four second connecting terminals 32 are exposed through the second hole 332, respectively. The operation of the second barrier 33 is described below.

Figure 5A:
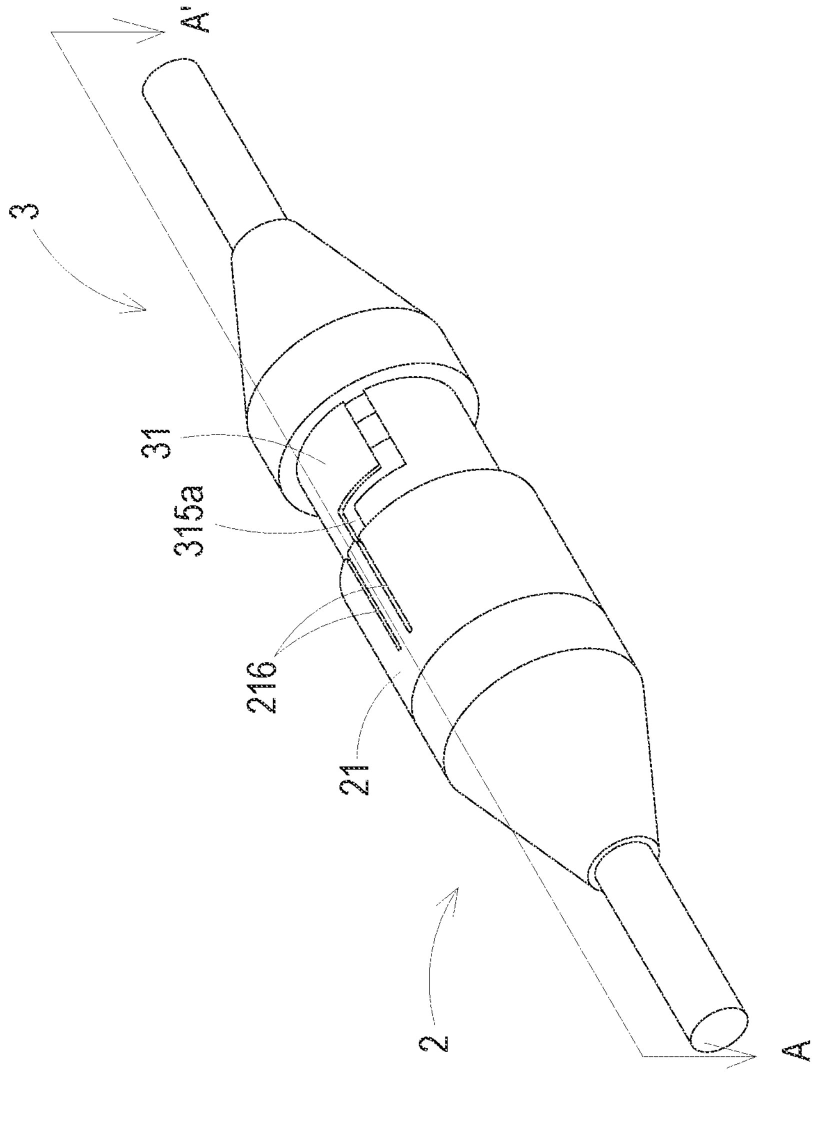
FIGS. 5A to 5D are schematic views illustrating an assembling process of the connector of FIG. 1.

FIGS. 5A to 5D are schematic views illustrating an assembling process of the connector of FIG. 1. FIGS. 6A to 6D are schematic cross-sectional views illustrating the connector of FIGS. 5A to 5D, respectively, and taken along the line A-A'. As shown in FIGS. 5A and 6A, the first main body 21 of the socket connecting element 2 is contacted with the second main body 31 of the plug connecting element 3, and the first guiding portion 215 of the first main body 21 is aligned to one end of the first path 315 of the second main body 31 adjacent to the first main body 21. Namely, the first guiding portion 215 of the first main body 21 is placed at one end of the first interval 315*a* of the first path 315 adjacent to the first main body 21. As shown in FIG. 6A, the second connecting terminal 32 of the plug connecting element 3 is covered by the second barrier 33 and cannot be exposed through the four second holes 332.

Figure 5B:
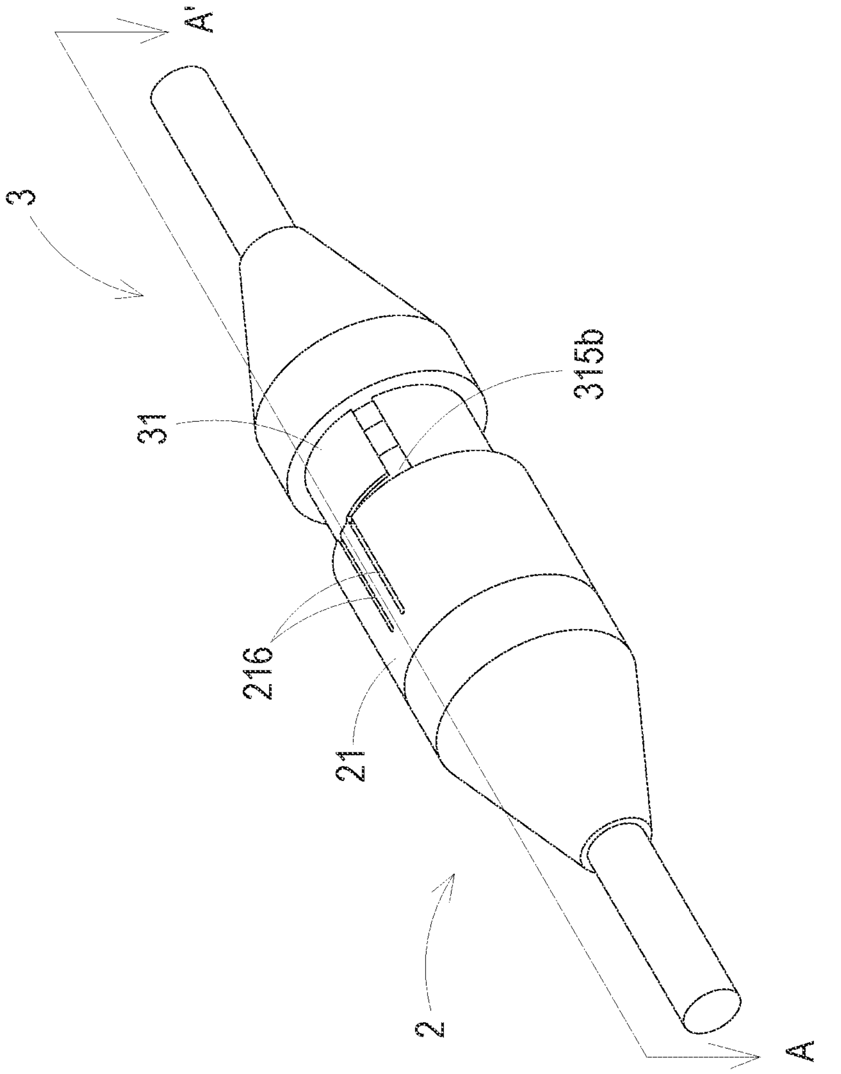
Figure 6A:
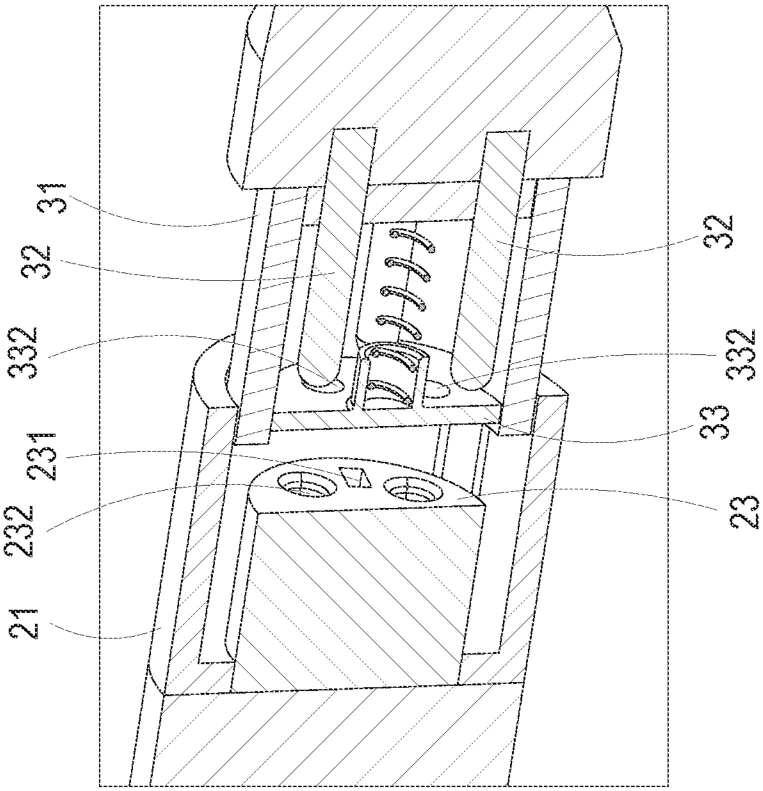
FIGS. 6A to 6D are schematic cross-sectional views illustrating the connector of FIGS. 5A to 5D, respectively, and taken along the line A-A'.
Figure 6B:
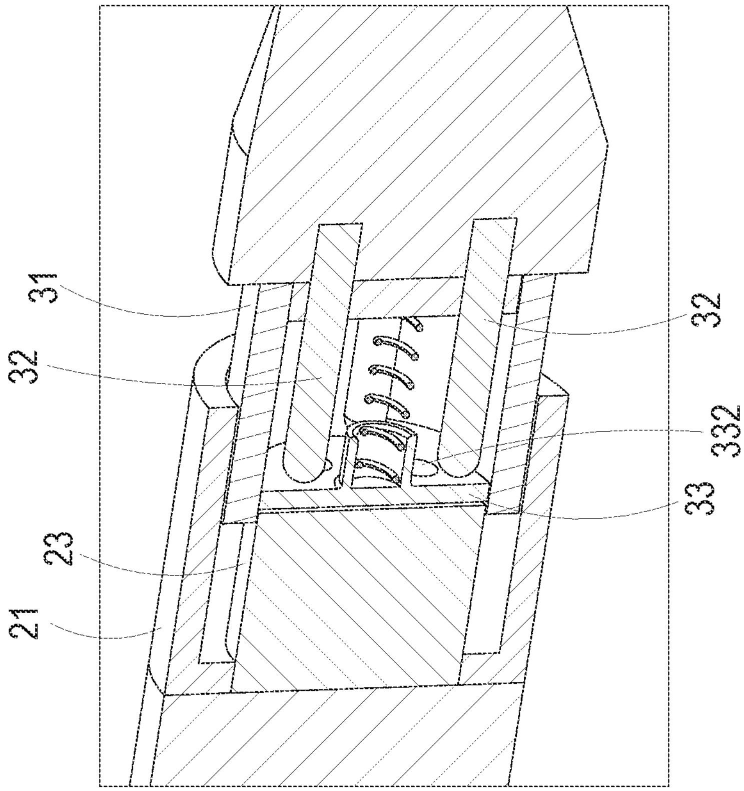

Then, as shown in FIGS. 2, 5B and 6B, the first main body 21 of the socket connecting element 2 is moved toward the second main body 31 of the plug connecting element 3 along the axial direction of the first main body 21. The first guiding portion 215 of the first main body 21 is moved to the connection between the first interval 315*a* and the second interval 315*b* along the first interval 315*a* of the first path 315 of the second main body 31, so that the second aligning portion 331 of the second barrier 33 is aligned to and engaged with the first aligning portion 231 of the first barrier 23, and the four second holes 332 of the second barrier 33 and the four first holes 232 of the first barrier 23 are spatially corresponding in position in one-to-one relationship. The first barrier 23 is fixed on the first main body 21. Namely, when the first main body 21 drives the first barrier 23 to move, the first barrier 23 drives the second barrier 33 to move along the interval of the second path 316 of the second main body 31 corresponding to the first interval 315*a* of the first path 315. As shown in FIG. 6B, the second connecting terminal 32 of the plug connecting element 3 is covered by the second barrier 33 and cannot be exposed through the four second holes 332.

Figure 5C:
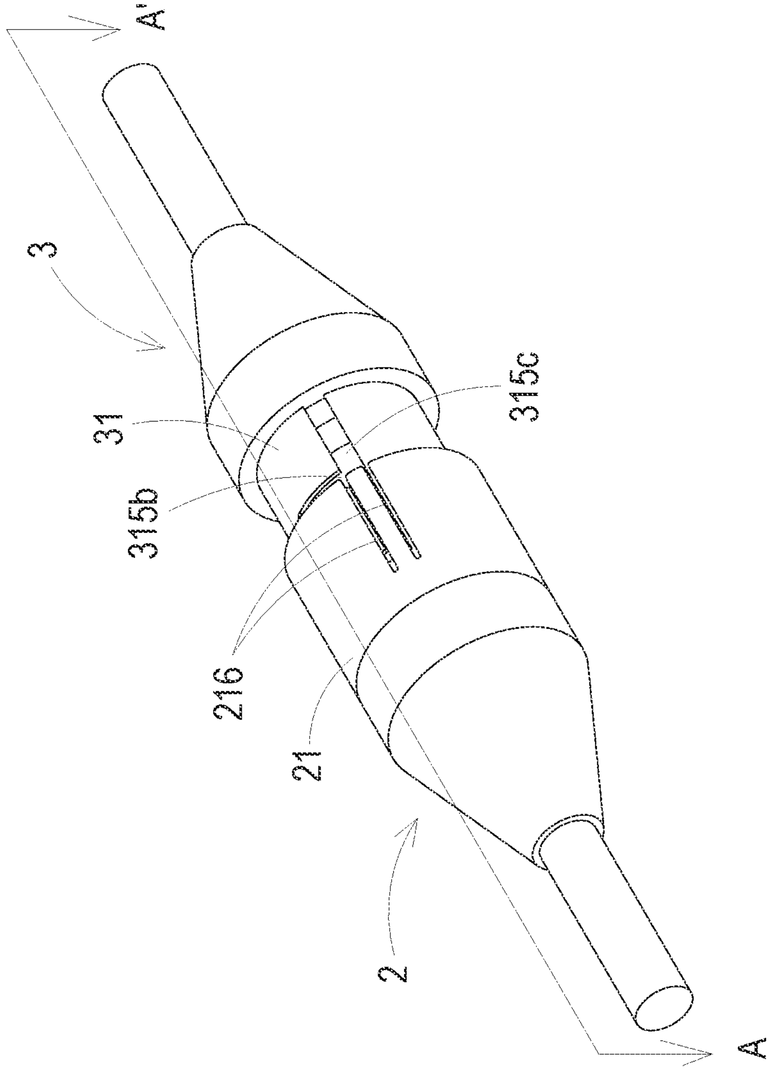
Figure 6C:
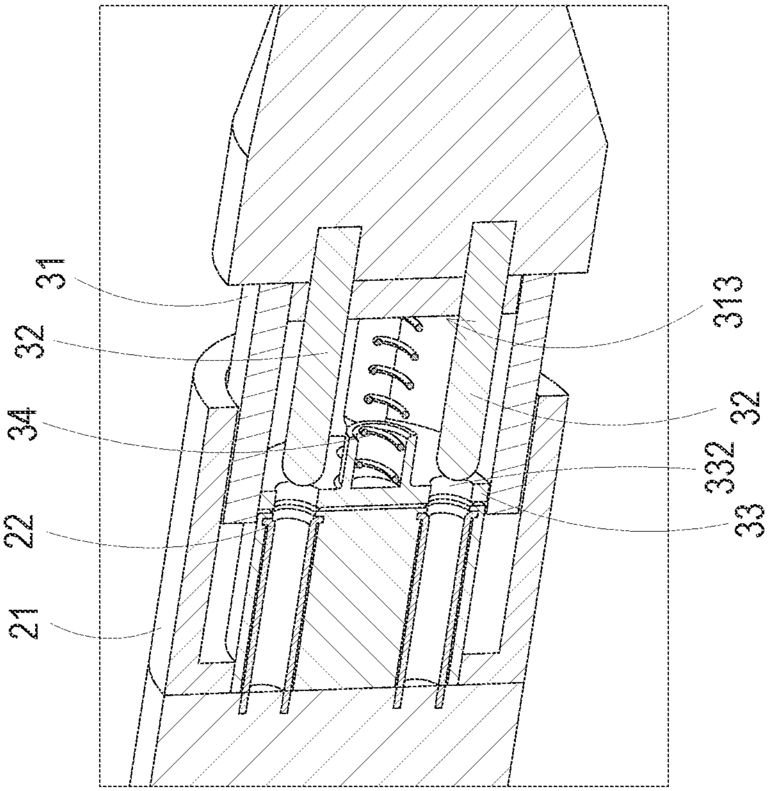

Then, as shown in FIGS. 2, 5C and 6C, the first main body 21 of the socket connecting element 2 is rotated along the second interval 315*b* of the plug connecting element 3. In more detail, the first guiding portion 215 of the first main body 21 is moved to the connection between the second interval 315*b* and the third interval 315*c* along the second interval 315*b* of the first path 315 of the second main body 31. The first main body 21 drives the first barrier 23 to rotate, and the first barrier 23 drives the second barrier 33 to rotate in the same direction. Namely, the first barrier 23 drives the second barrier 33 to rotate along the interval of the second path 316 of the second main body 31 corresponding to the second interval 315*b* of the first path 315. Consequently, the four second connecting terminals 32 and the four second holes 332 are spatially in position in one-to-one relationship. Namely, each second connecting terminal 32 is exposed through the second hole 332. Consequently, the four second connecting terminals 32, the four second holes 332, the four first holes 232 and the four first connecting terminals 22 are spatially in position in one-to-one relationship in sequence. Namely, each second connecting terminal 32, the corresponding second hole 332, the corresponding first hole 232 and the corresponding first connecting terminal 22 are aligned in sequence.

Figure 5D:
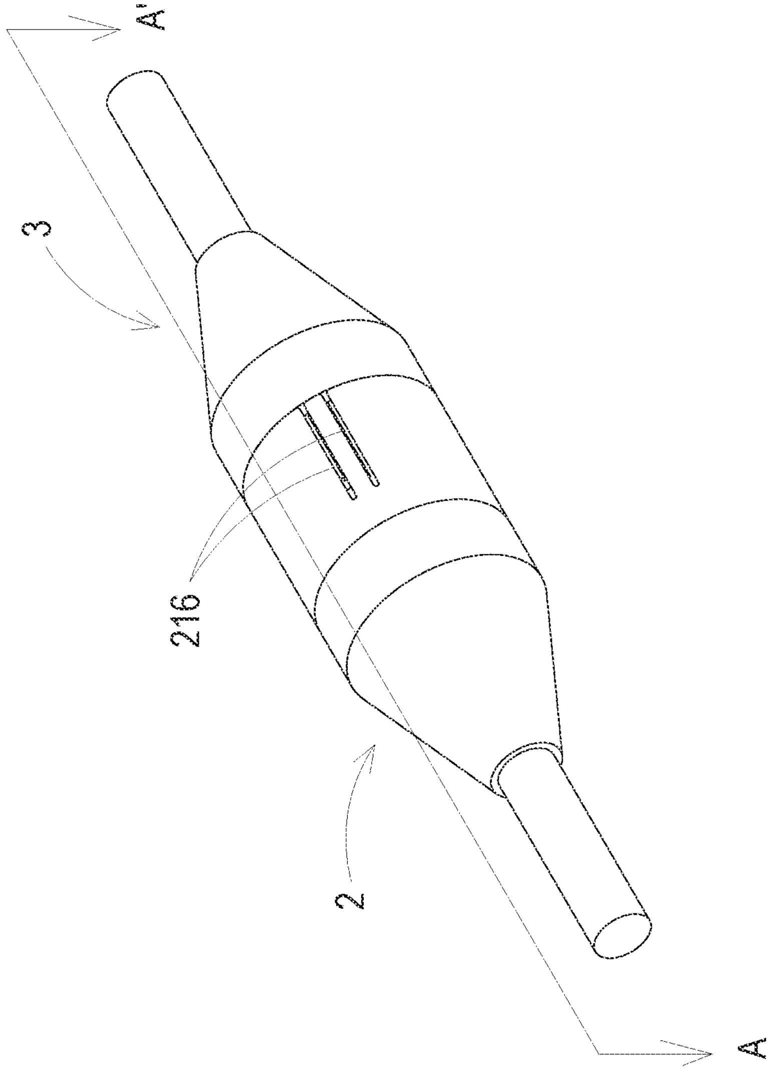
Figure 6D:
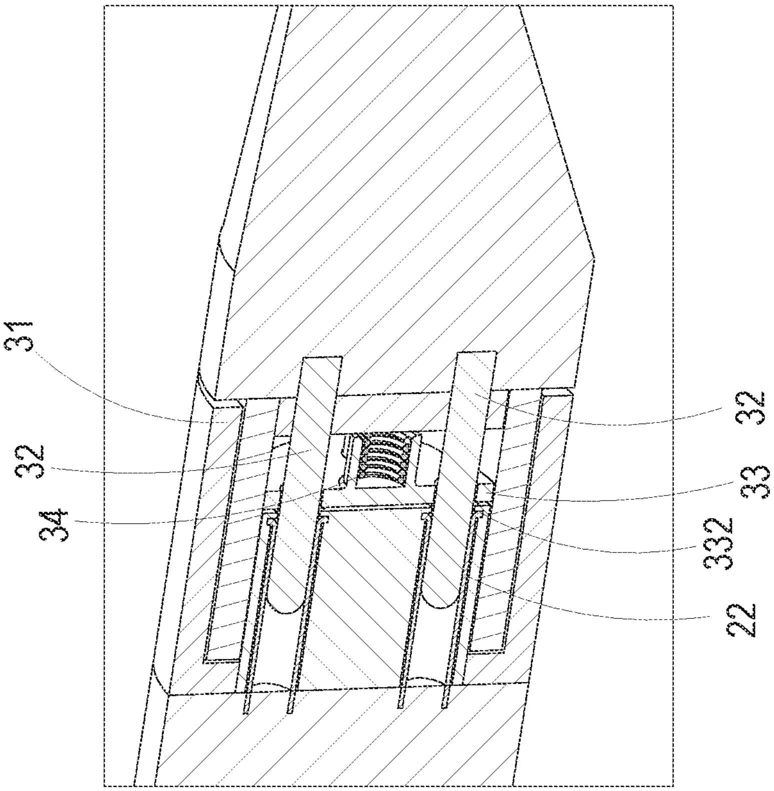

Then, as shown in FIGS. 2, 5D and 6D, the first main body 21 of the socket connecting element 2 is moved toward the second main body 31 of the plug connecting element 3 along the axial direction of the first main body 21. The first guiding portion 215 of the first main body 21 is moved along the third interval 315*c* of the first path 315 of the second main body 31. The first main body 21 drives the first barrier 23 to move, and the first barrier 23 drives the second barrier 33 to move in the same direction. Namely, the first barrier 23 drives the second barrier 33 to move along the interval of the second path 316 of the second main body 31 corresponding to the third interval 315*c* of the first path 315. Consequently, each second connecting terminal 32 penetrates through the corresponding second hole 332 and the corresponding first hole 232 so as to contact with the corresponding first terminal 22.

Please refer to FIGS. 6C and 6D, the plug connecting element 3 further includes a spring 34 disposed between the second barrier 33 and the bottom 313 of the second main body 31. Consequently, when the second connecting terminal 32 of the plug connecting element 3 is withdrawn from the first hole 232 of the first barrier 23, the spring 34 provides an elastic force to push the second barrier 33 back to its original position where the second barrier 33 is not forced by the first barrier 23.

As mentioned above, the connector of the present disclosure includes a first barrier and a second barrier. The plurality of first connecting terminals of the socket connecting element are disposed between the first barrier and the bottom of the first main body. The plurality of second connecting terminals of the plug connecting element are disposed between the second barrier and the bottom of the second main body. When the first main body is rotated and moved through the first path so as to drive the first barrier and the second barrier to rotate and move, the second connecting terminal penetrates through the second hole and the first hole so as to contact with the first connecting terminal. Consequently, when the plug connecting element is not assembled with the socket connecting element, the second barrier of the plug connecting element covers the second connecting terminal, and the second connecting terminal cannot be exposed so as to prevent user to contact the second connecting terminal. When the plug connecting element is assembled with the socket connecting element, the first main body is rotated and moved, so that the second connecting terminal penetrates through the second hole of the second barrier to contact the first connecting terminal. Consequently, the safety of the connector of the present disclosure is enhanced, and the risk of user getting an electric shock is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connector, comprising:

a socket connecting element comprising a first main body, a first barrier and a plurality of first connecting terminals, wherein an inner periphery surface of the first main body comprises a first guiding portion, the first main body comprises a first receiving portion, the first barrier is disposed in the first receiving portion and fixed on the first main body, the first barrier comprises a first aligning portion and a plurality of first holes, the first aligning portion is disposed on one side of the first barrier away from a bottom of the first main body, the plurality of first holes and the plurality of first connecting terminals are spatially corresponding in position in one-to-one relationship, and each one of the plurality of first connecting terminals is disposed on the bottom of the first main body; and a plug connecting element comprising a second main body, a second barrier and a plurality of second connecting terminals, wherein an outer periphery surface of the second main body comprises a first path, the second main body comprises a second receiving portion, the second barrier is disposed in the second receiving portion and comprises a second aligning portion and a plurality of second holes, the second aligning portion is disposed on one side of the second barrier away from a bottom of the second main body, and each one of the plurality of second connecting terminals is disposed on the second main body, wherein the second aligning portion and the first aligning portion are aligned to each other, so that the plurality of second holes and the plurality of first holes are spatially corresponding in position in a one-to-one relationship, the first guiding portion of the first main body is aligned to the first path of the second main body, the first main body is driven to rotate and move along a track of the first path, and the first barrier and the second barrier are rotated and moved, so that each one of the plurality of second connecting terminals penetrates through corresponding one of the plurality of second holes and corresponding one of the plurality of first holes so as to contact corresponding one of the plurality of first connecting terminals, wherein the plug connecting element further comprises a spring disposed between the second barrier and the bottom of the second main body, and the spring is configured to space the second barrier from the bottom of the second main body; when the socket connecting element and the plug connecting element are separated, the spring is configured to cause the plurality of second connecting terminals to be covered by the second barrier; when the socket connecting element and the plug connecting element are combined, the spring is compressed by the second barrier to allow the plurality of second connecting terminals to penetrate through the plurality of second holes and the plurality of first holes to contact the plurality of first connecting terminals.

2. The connector according to claim 1, wherein the first path comprises a first interval, a second interval and a third interval, a first end of the first interval is disposed on one end of the second main body adjacent to the first main body, an extension direction of the first interval is the same as an axial direction of the second main body, the second interval is disposed between a second end of the second interval and one end of the third interval, an extension direction of the second interval is perpendicular to the extension direction of the first interval, and an extension direction of the third interval is the same as the extension direction of the first interval.

3. The connector according to claim 2, wherein the second barrier of the plug connecting element comprises a second guiding portion protruded from an outer periphery edge of the second barrier, the second main body comprises a second path concavely formed from an inner periphery surface of the second main body, and the second guiding portion is aligned to the second path and drives the second barrier to rotate and move according to a track of the second path.

4. The connector according to claim 3, wherein the track of the second path of the second main body and the track of the first path of the second main body are aligned to each other and disposed on the two opposite sides of a surface of the second main body.

5. The connector according to claim 3, wherein one of the plurality of second connecting terminals is adjacent to an interval of the second path corresponding to the third interval of the first path.

6. The connector according to claim 3, wherein the second guiding portion of the second barrier is disposed in an interval of the second path corresponding to the first interval of the first path, and the plurality of second connecting terminals are covered by the second barrier and cannot be exposed through the plurality of second holes, wherein the second guiding portion of the second barrier is disposed in an interval of the second path corresponding to the third interval of the first path, and the plurality of second connecting terminals are exposed through corresponding one of the plurality of second holes, respectively.

7. The connector according to claim 1, wherein one of the plurality of first connecting terminals is adjacent to the first guiding portion.

8. The connector according to claim 1, wherein the first main body of the socket connecting element comprises two gaps, each of the two gaps is concavely formed from one side of the first main body adjacent to the second main body and away from the second main body, wherein the first guiding portion is disposed between the two gaps.

9. The connector according to claim 1, wherein a diameter formed by the inner periphery surface of the first main body is greater than or equal to a diameter formed by the outer surface of the second main body.

* * * * *